United States Patent
Onuma et al.

(10) Patent No.: US 10,220,756 B2
(45) Date of Patent: Mar. 5, 2019

(54) VEHICLE SEAT

(71) Applicant: TOYOTA JIDOSHA KABUSHIKI KAISHA, Toyota-shi, Aichi-ken (JP)

(72) Inventors: Masahiko Onuma, Toyota (JP); Yuuki Kadono, Toyota (JP); Hidenao Hamada, Kunitachi (JP); Masanobu Miyakoshi, Niiza (JP); Takuya Okada, Higashiyamato (JP)

(73) Assignee: TOYOTA JIDOSHA KABUSHIKI KAISHA, Toyota (JP)

(*) Notice: Subject to any disclaimer, the term of this patent is extended or adjusted under 35 U.S.C. 154(b) by 0 days.

(21) Appl. No.: 15/492,341

(22) Filed: Apr. 20, 2017

(65) Prior Publication Data

US 2018/0086238 A1 Mar. 29, 2018

(30) Foreign Application Priority Data

Sep. 23, 2016 (JP) .................. 2016-185886

(51) Int. Cl.
- *B60N 2/90* (2018.01)
- *A61H 9/00* (2006.01)
- *A61H 23/04* (2006.01)

(52) U.S. Cl.
CPC ............ *B60N 2/976* (2018.02); *A61H 9/005* (2013.01); *A61H 9/0092* (2013.01); *A61H 23/04* (2013.01); *A61H 2201/0103* (2013.01); *A61H 2201/0149* (2013.01); *A61H 2201/5071* (2013.01); *B60N 2/914* (2018.02)

(58) Field of Classification Search
CPC ........ B60N 2/976; B60N 2/914; A61H 9/005; A61H 9/0092; A61H 23/04

USPC ....................................... 297/284.3
See application file for complete search history.

(56) References Cited

U.S. PATENT DOCUMENTS

| | | | | |
|---|---|---|---|---|
| 4,120,061 | A * | 10/1978 | Clark ................ | A47C 27/081 297/DIG. 8 |
| 7,727,171 | B2 * | 6/2010 | Ozaki ................ | A61H 9/0078 601/105 |
| 8,162,398 | B2 * | 4/2012 | Colja ................ | A61H 9/0078 297/284.4 |
| 9,302,601 | B2 * | 4/2016 | Worlitz ................ | B60N 2/448 |
| 2005/0230946 | A1 | 10/2005 | Takashima | |
| 2017/0028163 | A1 | 2/2017 | Onuma et al. | |

FOREIGN PATENT DOCUMENTS

| | | |
|---|---|---|
| JP | S60-102016 U | 7/1985 |
| JP | 2003-275317 A | 9/2003 |
| JP | 2007-061490 A | 3/2007 |
| JP | 2017-030445 A | 2/2017 |
| WO | 2003/084786 A1 | 10/2003 |

* cited by examiner

*Primary Examiner* — Syed A Islam
(74) *Attorney, Agent, or Firm* — Oliff PLC

(57) ABSTRACT

A vehicle seat of the present invention has: a seat main body that has a seat cushion and a seatback; a concave portion that is provided in at least one of the seat cushion and the seatback, and that is provided at a region supporting a seated vehicle occupant, and that is formed in a shape that is recessed in a direction of moving away from the seated vehicle occupant; and a biometric signal detecting section having an airbag, which is mounted so as to extend over the concave portion and is capable of inflating and contracting, and a pressure sensor, which detects pressure applied to the airbag in a state in which the airbag is inflated.

9 Claims, 9 Drawing Sheets

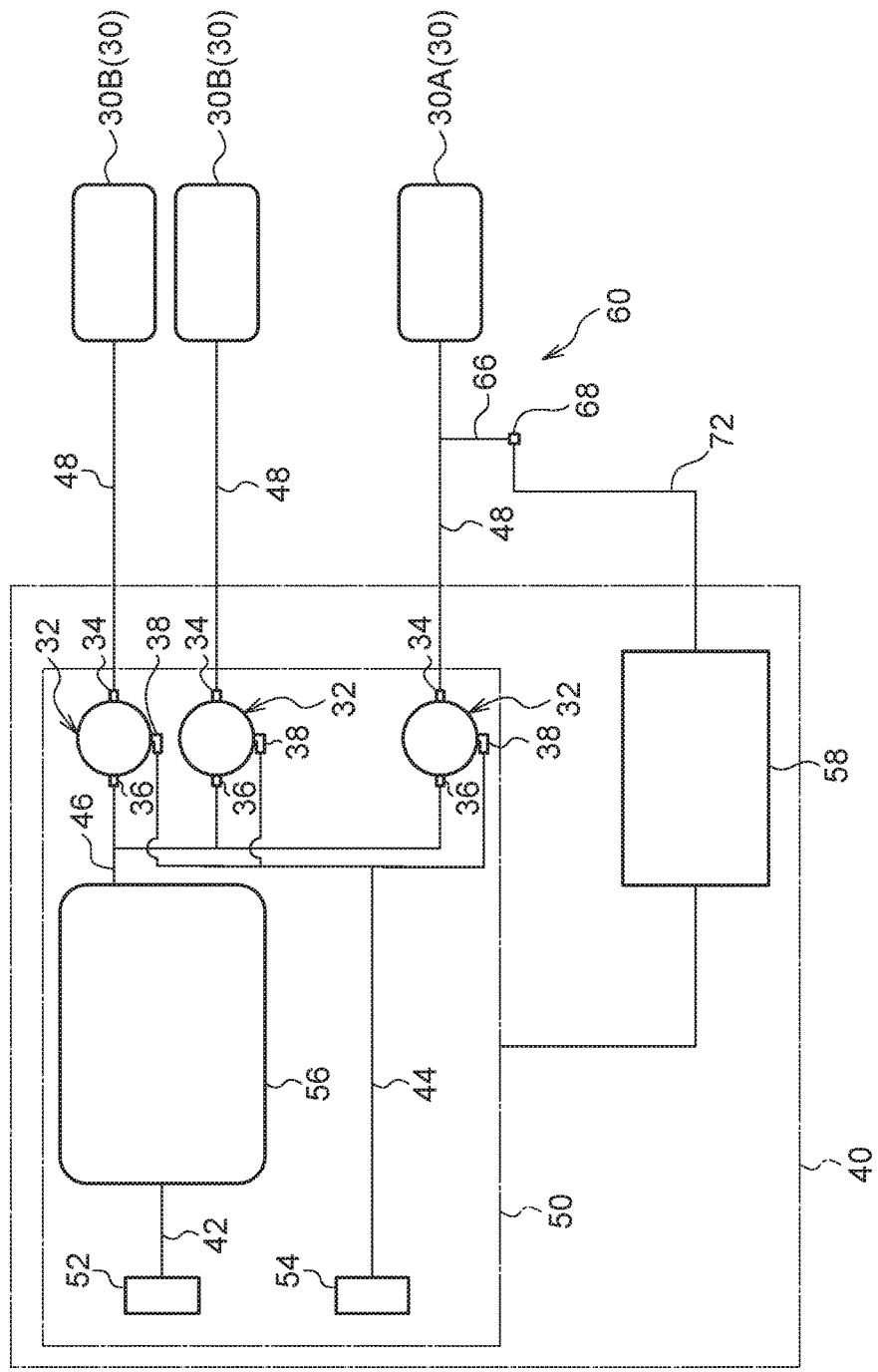

VEHICLE SEAT

CROSS-REFERENCE TO RELATED APPLICATION

This application claims priority under 35 USC 119 from Japanese Patent Application No. 2016-185886 filed Sep. 23, 2016, the disclosure of which is incorporated by reference herein.

BACKGROUND

Technical Field

The present invention relates to a vehicle seat.

Related Art

Japanese Patent Application Laid-Open (JP-A) No. 2007-061490 discloses a vehicle seat in which an airbag (a bladder) is disposed at the interior of the seatback or at the interior of the seat cushion, the air pressure at the airbag interior is detected by a pressure-sensitive element, and biometric information of the vehicle occupant is acquired. Note that there is the structure disclosed in International Publication No. 2003/84786 as a vehicle seat in which an airbag-type pressure sensor is mounted to at least one of a seatback and a seat cushion, and biometric signals of the vehicle occupant are detected.

In the structure of JP-A No. 2007-061490, when a vehicle occupant sits in the vehicle seat, the airbag and a pressure-receiving plate that contacts the airbag are nipped-in by the seat main body, and there are cases in which vibrations, such as road noise during traveling of the vehicle or the like, are inputted as vibrations to the airbag. Therefore, in the structure disclosed in JP-A No. 2007-061490, there is room for improvement from the standpoint of maintaining the accuracy of detecting biometric information good.

SUMMARY

In view of the above-described circumstances, the present invention provides a vehicle seat that suppresses input to an airbag of vibrations from the vehicle body.

A vehicle seat of a first aspect of the present invention has: a seat main body that has a seat cushion and a seatback; a concave portion that is provided in at least one of the seat cushion and the seatback, and that is provided at a region supporting a seated vehicle occupant, and that is formed in a shape that is recessed in a direction of moving away from the seated vehicle occupant; and a biometric signal detecting section having an airbag, which is mounted so as to extend over the concave portion and is capable of inflating and contracting, and a pressure sensor, which detects pressure applied to the airbag in a state in which the airbag is inflated.

In accordance with the first aspect, the concave portion, which is formed in a shape that is recessed in a direction of moving away from the seated vehicle occupant, is provided at a region that supports the vehicle occupant at at least one of the seat cushion and the seatback at the seat main body. The airbag that can inflate and contract is mounted so as to extend over the concave portion. The biometric signal detecting section has the airbag and the pressure sensor. In the state in which the vehicle occupant is seated and the airbag is inflated, due to pressure that is applied to the airbag being detected by the pressure sensor, biometric signals of the vehicle occupant are detected. At the vehicle seat, the airbag is mounted so as to extend over the concave portion. As compared with a case in which there is no concave portion, at the time when the vehicle occupant is seated, the inflated airbag being pushed-against the seat main body is suppressed. Therefore, vibrations from the vehicle body being inputted via the seat main body to the airbag at the time of biometric signal detection is suppressed.

In a vehicle seat of a second aspect of the present invention, in the first aspect, a mounting piece extends-out toward an outer side from the airbag, and the mounting piece is mounted to a peripheral edge of the concave portion.

In accordance with the second aspect, the mounting piece, which extends-out toward the outer side from the airbag, is mounted to a peripheral edge of the concave portion. Due thereto, the entire airbag can be disposed at a position, at which the airbag does not contact the seat main body, within the concave portion, and vibrations from the vehicle body being inputted to the airbag when the vehicle occupant is seated is suppressed more reliably.

In a vehicle seat of a third aspect of the present invention, in the first aspect, the airbag is structured so as to not contact a bottom surface of the concave portion in a state in which the airbag is inflated at a time of biometric signal detection.

In accordance with the third aspect, the airbag is structured so as to not contact the bottom surface of the concave portion in the inflated state at the time of biometric signal detection. When the vehicle occupant is seated, the inflated airbag being pushed-against the seat main body is suppressed more reliably. Therefore, at the time of biometric signal detection, vibrations from the vehicle body being inputted via the seat main body to the airbag is suppressed more reliably.

In a vehicle seat of a fourth aspect of the present invention, in the first aspect, the airbag is disposed beneath buttocks of the seated vehicle occupant.

In accordance with the fourth aspect, the airbag is disposed beneath the buttocks of the seated vehicle occupant, and pressure is applied stably to the airbag when the vehicle occupant is seated. Therefore, the biometric signals can be detected stably.

A vehicle seat of a fifth aspect of the present invention has, in the first aspect, plural massaging airbags at at least one of the seat cushion and the seatback, wherein at least one massaging airbag, among the plurality of massaging airbags, is made to be the airbag of the biometric signal detecting section.

In accordance with the fifth aspect, the vehicle seat has plural massaging airbags at at least one of the seat cushion and the seatback. At least one airbag, among the plural massaging airbags, is made to be the airbag of the biometric signal detecting section. Therefore, a biometric signals can be detected by utilizing a massaging airbag. Thus, there is no need to provide an airbag that is used exclusively for detecting biometric signals, and the structure can be simplified.

In a vehicle seat of a sixth aspect of the present invention, in the fifth aspect, the massaging airbag that is provided at the biometric signal detecting section is, at a time of biometric signal detection, set in a first inflated state in which the airbag does not contact a bottom surface of the concave portion, and, at a time of massaging, the airbag inflates and contracts and, when inflated, is set in a second inflated state in which the airbag inflates more than in the first inflated state and contacts the bottom surface of the concave portion.

In accordance with the sixth aspect, at the time of biometric signal detection, the airbag of the biometric signal detecting section is set in a first inflated state in which the airbag does not contact the bottom surface of the concave portion. Due thereto, in the first inflated state, when the vehicle occupant is seated, vibrations from the vehicle body being inputted to the airbag via the seat main body is suppressed. Further, at the time of massaging, the airbag of the biometric signal detecting section inflates and expands, and, when inflated, the airbag is set in a second inflated state in which the airbag is inflated more than in the first inflated state and the airbag contacts the bottom surface of the concave portion. Due thereto, in the second inflated state, the force by which the airbag pushes the vehicle occupant becomes large due to the reaction force from the bottom surface of the concave portion that the airbag contacts. Therefore, the massaging effect by the airbag can be improved.

BRIEF DESCRIPTION OF THE DRAWINGS

Exemplary embodiments of the present invention will be described in detail based on the following figures, wherein:

FIG. 6 is a block diagram showing an airbag driving device that is provided at the vehicle seat relating to the first embodiment;

DETAILED DESCRIPTION

Embodiments of the present invention are described in detail hereinafter on the basis of the drawings. Note that arrow FR that is shown appropriately in the respective drawings indicates the forward side of a vehicle seat, arrow UP indicates the upward side of the vehicle seat, and arrow RH indicates the rightward direction of the vehicle seat. Further, in the following explanation, when longitudinal, vertical and left-right directions are used without being specified, they indicate the longitudinal of the longitudinal direction at the vehicle seat, the vertical of the vertical direction at the vehicle seat, and the left-right in the left-right direction at the vehicle seat (the transverse direction of the vehicle seat).

First Embodiment

Figure 1:
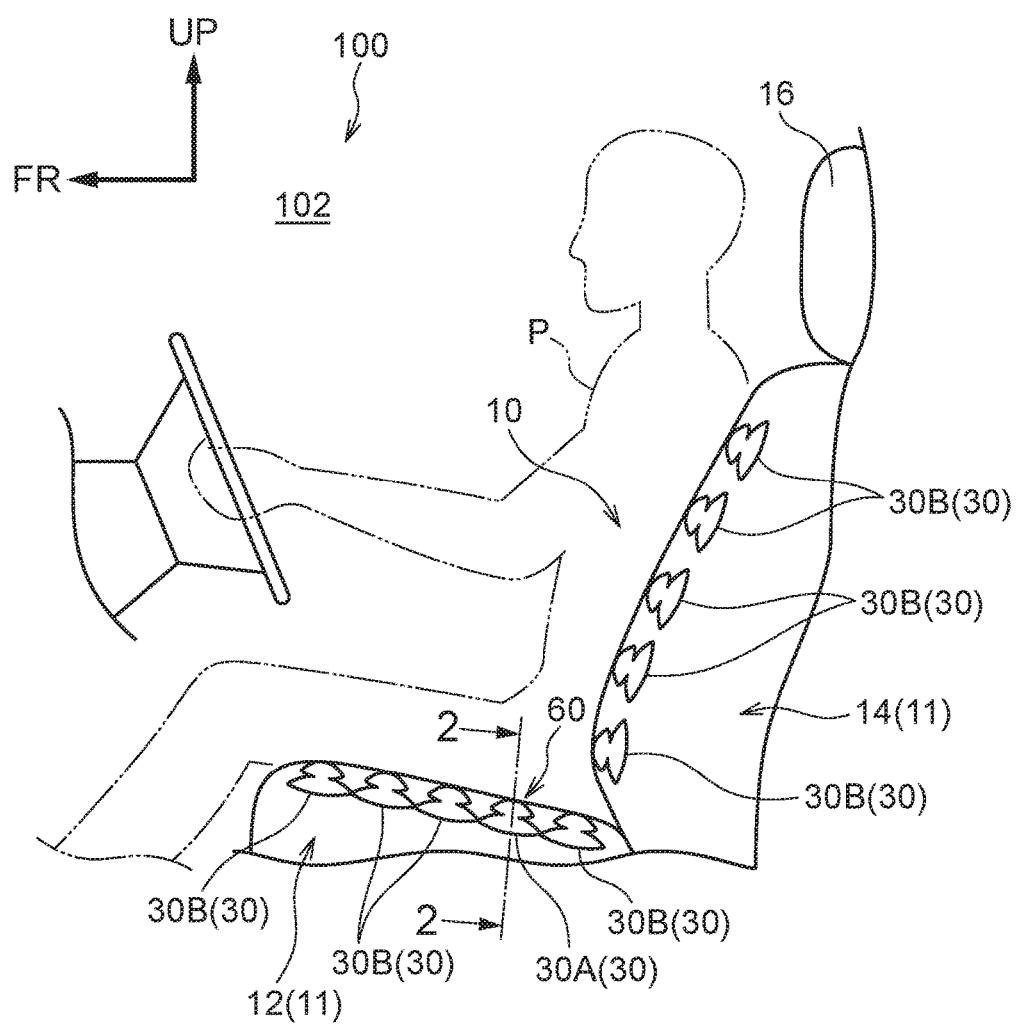
FIG. 1 is a cross-sectional view showing a vehicle seat relating to a first embodiment.

A vehicle seat 10 relating to a first embodiment is described by using FIG. 1 through FIG. 7B. As shown in FIG. 1, the vehicle seat 10 has a seat cushion 12 that supports the buttocks and thigh regions of a seated vehicle occupant P (in FIG. 1, the driver as an example), and a seatback 14 that is provided so as to extend upward from the rear end portion of the seat cushion 12 and that supports the lumbar region and the back region of the vehicle occupant P. Further, a headrest 16 that supports the head portion of the vehicle occupant P is provided at the upper end portion of the seatback 14. Here, the seat cushion 12 and the seatback 14 are made to be a seat main body 11. The vehicle seat 10 is disposed so as to face toward the front side in the vehicle longitudinal direction within a vehicle cabin 102 of a vehicle 100. Further, in the first embodiment, the vehicle seat 10 is a vehicle seat for the driver.

Plural airbags 30 for massaging are provided at the obverse sides (the sides at which the vehicle occupant P sits) of the interiors of the seat cushion 12 and the seatback 14 respectively. The respective airbags 30 are structured so as to be able to inflate and contract. Due to the respective airbags 30 inflating and pushing portions of the body of the vehicle occupant P, the airbags 30 massage the lumbar region, the back region, the thigh regions and the like of the vehicle occupant P, and relax or refresh the vehicle occupant P.

The five airbags 30 that are at the interior of the seatback 14 are disposed along the vertical direction of the seatback 14. The five airbags 30 that are at the interior of the seat cushion 12 are disposed along the longitudinal direction of the seat cushion 12. Further, although not illustrated, the airbags 30 at the interior of the seatback 14 are disposed in the vertical direction in plural rows (e.g., two rows) that are apart in the transverse direction of the seatback 14. Although not illustrated, the airbags 30 at the interior of the seat cushion 12 are disposed in the longitudinal direction in plural rows (e.g. two rows) that are apart in the transverse direction of the seat cushion 12.

The plural airbags 30 at the interior of the seat cushion 12 include an airbag 30A that is structured to also serve as a biometric signal detecting section 60 that is described later, and plural airbags 30B that are used only for massaging. More concretely, the airbag 30A, which, among the plural airbags 30 of the seat cushion 12, is disposed second from the rear side in the vehicle longitudinal direction, is provided at the biometric signal detecting section 60. The airbag 30A is disposed beneath the buttocks of the vehicle occupant P who is seated in the vehicle seat 10. Note that, in a structure in which the airbags 30 at the interior of the seat cushion 12 are disposed in the longitudinal direction in plural rows (e.g., two rows) that are apart in the transverse direction, plural (e.g., two) of the airbags 30A in the transverse direction are structured so as to also serve as the biometric signal detecting sections 60.

The airbags 30 that are at the interior of the seatback 14 are the airbags 30B that are used only for massaging. Namely, the biometric signal detecting section 60 is not provided at the seatback 14. Note that, in the following explanation, when there is no need to discriminate between the airbags 30A, 30B, there are cases in which the letter A, B is omitted and the airbags are referred to as the airbags 30.

Figure 2:
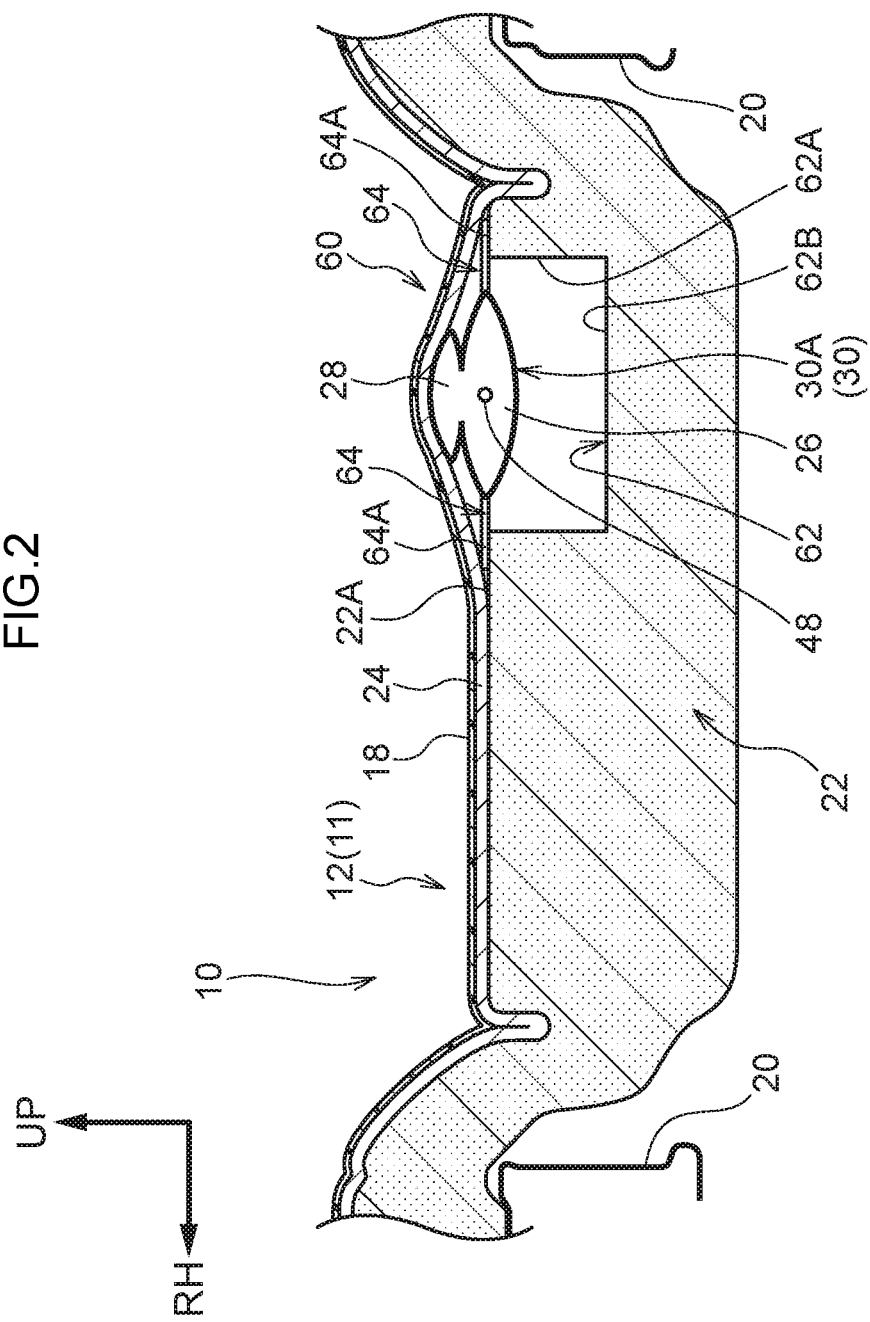
FIG. 2 is a cross-sectional view along line 2-2 of FIG. 1, showing an airbag of a biometric signal detecting section and a concave portion that are provided at the vehicle seat.

As shown in FIG. 2, the seat cushion 12 has seat cushion frames 20 (upon occasion, also called side frames with reference to FIG. 2) that are disposed at the vehicle transverse direction both sides, and a seat cushion pad 22 that is supported by the seat cushion frames 20. Moreover, the seat cushion 12 has a slab 24 that is shaped as a sheet and is disposed at the obverse side of the seat cushion pad 22, and a surface skin 18 that covers the obverse side of the slab 24. A concave portion 62, which is recessed in a direction of moving away from the seated vehicle occupant P (see FIG. 1), is provided in an obverse 22A of the seat cushion pad 22 (the obverse 22A at the slab 24 side). Namely, the concave portion 62 is provided at a region, which supports the vehicle occupant P, of the seat cushion pad 22, and is formed in a shape that is recessed in the direction of moving away from the seated vehicle occupant P. In other words, the concave portion 62 is a shape that is recessed from the obverse side toward the reverse side of the seat cushion pad 22. The concave portion 62 is formed by, for example, cutting-out the obverse 22A of the seat cushion pad 22 in a concave shape. The airbag 30A is mounted in the concave portion 62.

Note that FIG. 2 illustrates the airbag 30A that is at the right side in the left-right direction as seen from the front of the vehicle seat 10 (the transverse direction right side as seen from the front). In a structure in which the airbags 30 that are at the interior of the seat cushion 12 are disposed in the longitudinal direction in plural rows (e.g., two rows) that are apart in the transverse direction of the seat cushion 12, the mounting structure of the other airbag 30A that is at the left side in the left-right direction as seen from the front of the vehicle seat 10 is the same, and therefore, illustration thereof is omitted. The mounting structure of the airbag 30A, and the biometric signal detecting section 60, are described later.

The seat cushion pad 22 is formed from a cushion body, and is formed of a foamed resin such as, for example, urethane foam or the like. The slab 24 is formed of a material that is more flexible than the seat cushion pad 22 and that is elastically (flexurally) deformable, e.g., a foamed resin such as urethane foam or the like whose void ratio is different than that of the seat cushion pad 22. As an example, the slab 24 is provided in order to improve the seating comfort of the vehicle seat 10. Further, the surface skin 18 also structures the design surface of the vehicle seat 10.

Figure 3:
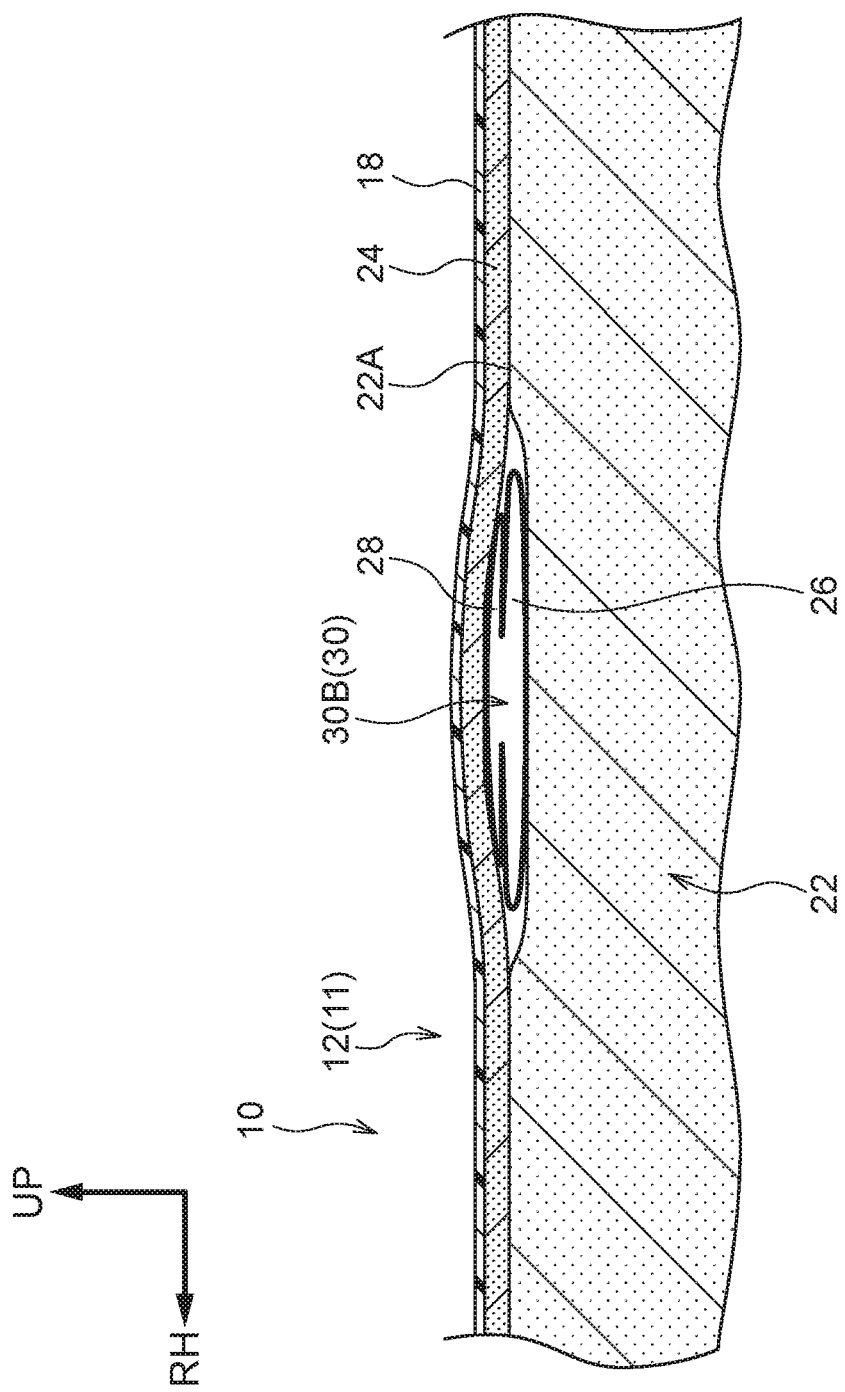
FIG. 3 is a cross-sectional view showing a state in which an airbag, which is an airbag for massaging that is provided at the vehicle seat relating to the first embodiment and which is other than the airbag of the biometric signal detecting section, is contracted.
Figure 4:
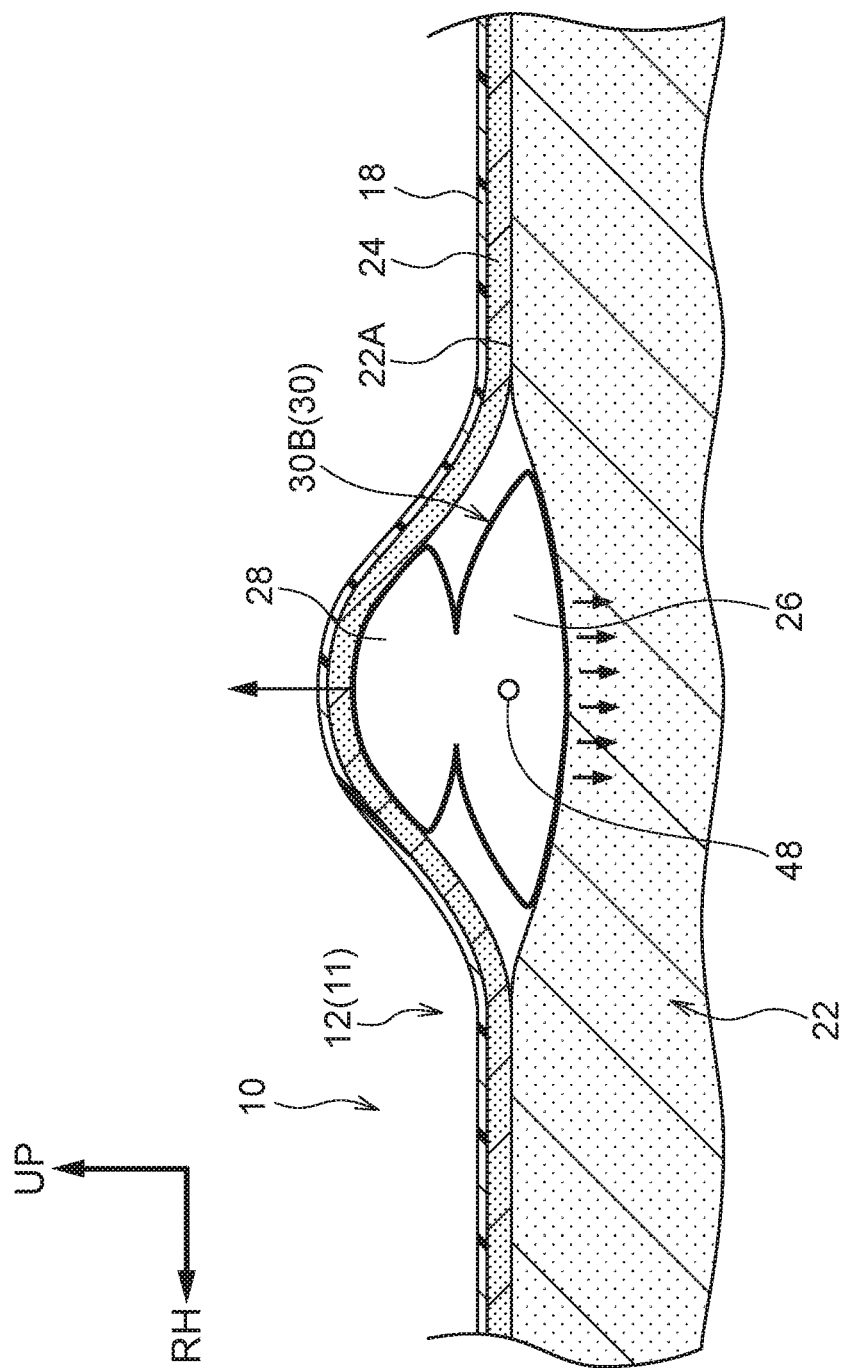
FIG. 4 is a cross-sectional view showing a state in which the airbag, which is the airbag for massaging that is provided at the vehicle seat relating to the first embodiment and which is other than the airbag of the biometric signal detecting section, is inflated.

The airbag 30B that is used only for massaging, i.e., the airbag 30B that is other than the airbag 30A that is provided at the biometric sensor 60, is shown in cross-sectional views in FIG. 3 and FIG. 4. Because the plural airbags 30B that are within the seat cushion 12 and the plural airbags 30B that are within the seatback 14 have the same structure, description referencing FIG. 3 and FIG. 4 is given by using the airbag 30B that is within the seat cushion 12 as an example.

As shown in FIG. 3 and FIG. 4, the airbag 30B is disposed between the seat cushion pad 22 and the slab 24 due to the back surface (the surface that is at the opposite side, in the obverse-reverse direction, from the obverse that is at the slab 24 side) thereof being fixed by double-sided tape or an adhesive to the obverse 22A of the seat cushion pad 22.

As shown in FIG. 2 through FIG. 5, the structure of the airbag 30 itself is the same at the airbag 30A and the airbag 30B. Therefore, first, the structure that is common to both the airbag 30A and the airbag 30B is described. The airbags 30A, 30B are formed of a material that can extend and contract such as a resin material, like polyurethane or the like, or a rubber material or the like. Each of the airbags 30A, 30B is structured so as to inflate and contract individually by an airbag driving device 40 (see FIG. 6) that is described later. The airbags 30A, 30B have a large diameter portion 26, which is formed in a substantially rectangular shape as seen in an elevation viewed from above and whose outer diameter is large, and a small diameter portion 28, which communicates with the large diameter portion 26 and which is substantially rectangular and whose outer diameter is smaller than that of the large diameter portion 26 (see FIG. 5). The small diameter portion 28 is disposed at the upper side of the large diameter portion 26 in the vertical direction.

The airbag 30B has a mounting structure that is different than that of the airbag 30A that is provided at the biometric signal detecting section 60. As shown in FIG. 3 and FIG. 4, the large diameter portion 26 of the airbag 30B is fixed to the obverse 22A of the seat cushion pad 22, and the small diameter portion 28 is disposed at the slab 24 side. Due to inflation of the airbag 30B, the slab 24 and the surface skin 18, at the portions thereof where the airbag 30B of the seat cushion 12 is disposed, swell upward and are pushed by the airbag 30B, and the seat cushion pad 22 sinks-in toward the lower side in the vertical direction due to elastic deformation (see FIG. 4). In other words, because the slab 24 is structured of a material that is more flexible than the seat cushion pad 22 and is elastically (flexurally) deformable, when the airbag 30B inflates, the slab 24 and the surface skin 18 bulge-out toward the vehicle upper side (see FIG. 4).

The mounting structure in which the airbag 30A of the biometric signal detecting section 60 is mounted to the seat cushion 12 is described here. FIG. 2 shows a state in which the airbag 30A is inflated.

Figure 5:
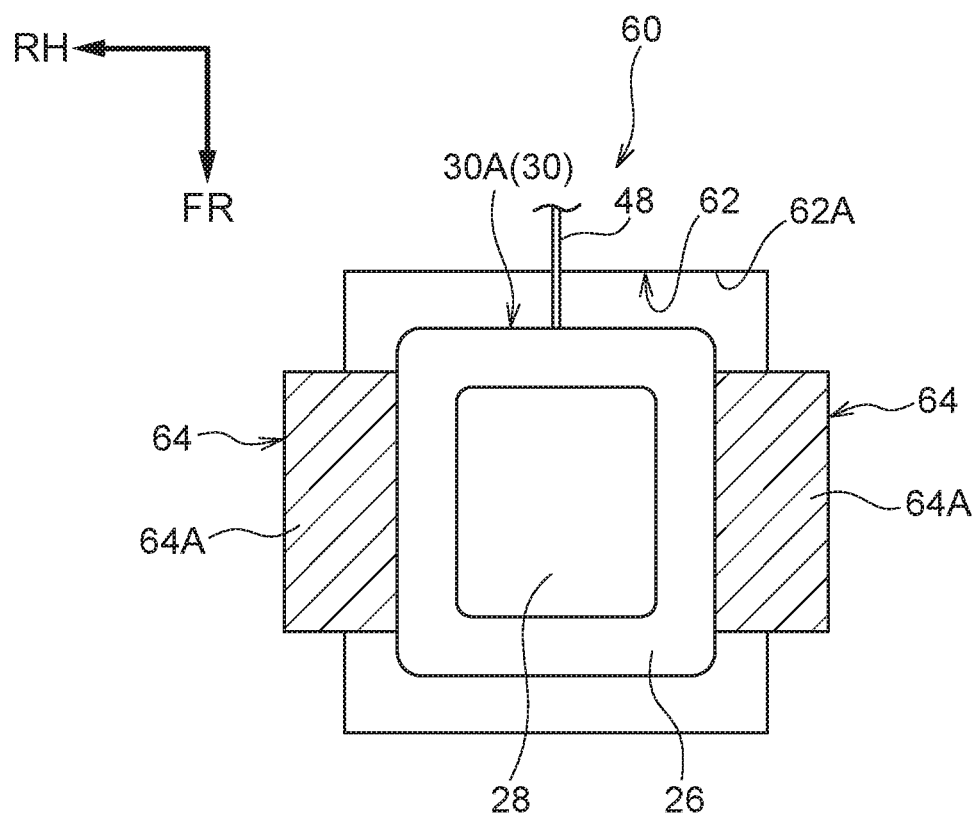
FIG. 5 is a plan sectional view showing the airbag of the biometric signal detecting section that is provided at the vehicle seat relating to the first embodiment.

As shown in FIG. 2 and FIG. 5, mounting pieces 64, which extend-out toward the transverse direction outer sides from the large diameter portion 26, are provided at the transverse direction both sides of the large diameter portion 26 of the airbag 30A. The mounting pieces 64 are structured by plate-shaped bodies, and are fixed to the large diameter portion 26. The mounting pieces 64 are formed from a resin material such as, for example, polyurethane or the like, and are joined to the side portions at the transverse direction both sides of the large diameter portion 26 by adhesion, fusion, or the like. Although not illustrated, the large diameter portion 26 is structured by, for example, two members that are an upper side member and a lower side member being affixed together, and the upper side member and the lower side member are joined together by adhesion, fusion or the like in a state in which the mounting pieces 64 are nipped between the upper side member and the lower side member. Note that, instead of this structure, the airbag 30A and the pair of mounting pieces 64 may be formed of a resin material by integral molding.

As described above, the concave portion 62 is provided in the obverse 22A of the seat cushion pad 22, and the concave portion 62 is formed in a parallelepiped shape or a cubic shape. The concave portion 62 has four side walls 62A, which are substantially rectangular and are disposed substantially along the vertical direction, and a bottom surface 62B that is disposed substantially in the longitudinal direction and substantially in the transverse direction from the end portions at the vertical direction lower sides of the side walls 62A (see FIG. 2). The size of the concave portion 62 is greater than the size of the airbag 30A. Namely, in the state in which the airbag 30A is disposed at the substantially central portion of the concave portion 62 interior, gaps are formed between the large diameter portion 26 and the side walls 62A of the concave portion 62.

In the state in which the airbag 30A is disposed within the concave portion 62, outer side end portions 64A of the pair of mounting pieces 64 are fixed to peripheral edges of the concave portion 62 at the obverse 22A of the seat cushion pad 22. For example, the outer side end portions 64A of the pair of mounting pieces 64 are joined to peripheral edges of the concave portion 62 at the obverse 22A of the seat cushion pad 22 by adhesion or the like. The airbag 30A is structured such that, in the inflated state, the large diameter portion 26 and the small diameter portion 28 do not contact the side walls 62A of the concave portion 62, and the large diameter portion 26 does not contact the bottom surface 62B of the concave portion 62.

A common tube 48, which is described later and is for supplying and discharging air to and from the airbag 30A, is connected to the large diameter portion 26. Due thereto, air is supplied from the common tube 48 into the large diameter portion 26, and moreover, air is supplied to the small diameter portion 28 that communicates with the large diameter portion 26. Because the slab 24 is structured of a material that is more flexible than the seat cushion pad 22 and that is elastically (flexurally) deformable, when the airbag 30A inflates, the slab 24 and the surface skin 18 are made to bulge-out toward the vehicle upper side (see FIG. 2).

Note that, as shown in FIG. 4, at the airbag 30B as well, the structure in which the common tube 48 is connected to the large diameter portion 26 is the same as at the airbag 30A.

Here, the airbag driving device 40, which carries out supplying and discharging of air to and from the airbags 30A, 30B, and the biometric signal detecting section 60, which has the airbag 30A, are described by using FIG. 6 and the like. First, the structure of the airbag driving device 40 is described, and thereafter, the structure of the biometric signal detecting section 60 is described.

As shown in FIG. 6, the airbag driving device 40 is structured to include an air supplying/discharging device 50, to which the plural airbags 30 (the airbags 30A, 30B) are connected and which inflates and contracts the respective airbags 30 individually, and a control device (ECU) 58 that controls the air supplying/discharging device 50. The air supplying/discharging device 50 is structured to include a suction hole 52, an exhaust hole 54, a pump 56 for sending air under pressure, and plural electromagnetic valves 32.

The electromagnetic valves 32 are provided in respective correspondence with the airbags 30 (the airbags 30A, 30B). Each of the electromagnetic valves 32 is a three-way valve, and has a common port 34, a suction port 36 and an exhaust port 38. The common tubes 48 are connected to the respective common ports 34, and suction tubes 46 are connected to the respective suction ports 36. Exhaust tubes 44 are connected to the respective exhaust ports 38.

The respective common tubes 48 are connected to the corresponding airbags 30 (airbags 30A, 30B), and the suction tubes 46 are connected to the pump 56. The exhaust tubes 44 are connected to the exhaust hole 54. Further, the pump 56 and the suction hole 52 communicate with one another and are connected together by a suction pipe 42. Note that the suction tubes 46 and the exhaust tubes 44 respectively branch-off from a single tube, and are connected to the respective electromagnetic valves 32.

The control device 58 is electrically connected to the air supplying/discharging device 50, and controls the operation of the pump 56 and the opening and closing of the respective ports (the common ports 34, the suction ports 36, the exhaust ports 38) of the electromagnetic valves 32. Note that the control device 58 is structured so as to be able to individually control the opening and closing of the respective ports (the common ports 34, the suction ports 36, the exhaust ports 38) of the respective electromagnetic valves 32.

Further, the control device 58 is electrically connected to an operation section (not illustrated) that is operated by the vehicle occupant P who is seated in the vehicle seat 10. Accordingly, due to the vehicle occupant P operating the operation section, inflation and contraction of the plural (some of or all of) airbags 30 (airbags 30A, 30B) are repeated individually and intermittently.

Concretely, when, due to control of the control device 58, a supplying state is set in which the common port 34 and the suction port 36 of the electromagnetic valve 32 are open and the exhaust port 38 is closed and the common tube 48 and the suction tube 46 communicate with one another, air is supplied from the pump 56 into the airbag 30 (the airbag 30A, 30B). Due thereto, the airbag 30A inflates as shown in FIG. 2, and the airbag 30B inflates as shown in FIG. 4.

Further, when, due to control of the control device 58, a discharging state is set in which the common port 34 and the exhaust port 38 of the electromagnetic valve 32 are open and the suction port 36 is closed and the common tube 48 and the exhaust tube 44 communicate with one another, air is discharged from the interior of the airbag 30A, 30B. Due thereto, the airbag 30 contracts as shown in FIG. 3. Note that, with regard to the contracting of the airbag 30A, the contracted state thereof is substantially the same as that of the airbag 30B shown in FIG. 3, and therefore, illustration thereof is omitted.

The airbag driving device 40 (the air supplying/discharging device 50 and the control device 58) is disposed within the seatback 14 or within the seat cushion 12.

Figure 7A:
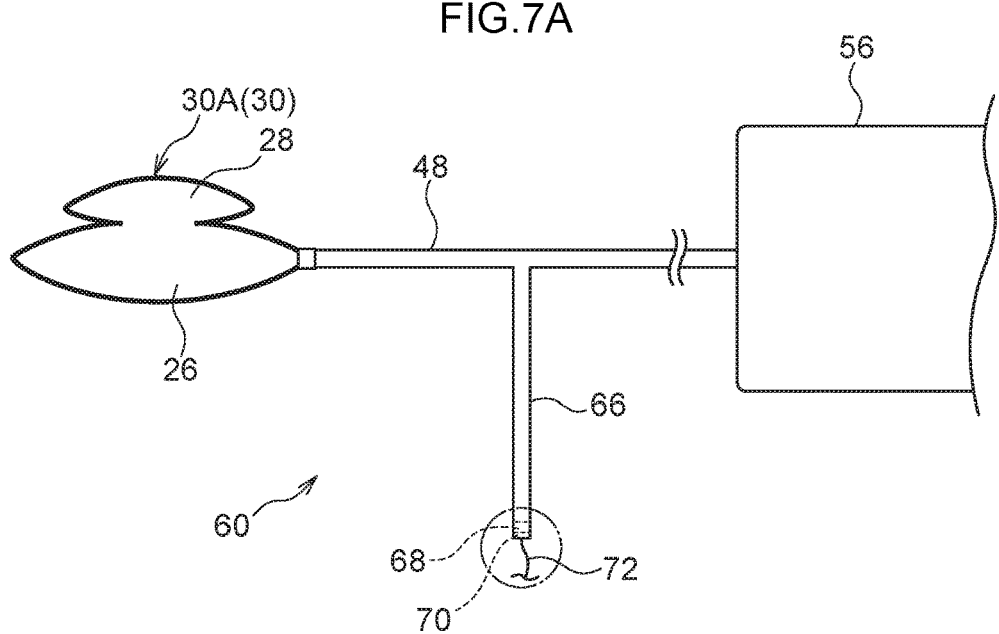
FIG. 7A is a cross-sectional view showing the biometric signal detecting section that is provided at the vehicle seat relating to the first embodiment.

As shown in FIG. 6 and FIG. 7A, the biometric signal detecting section 60 has the airbag 30A, and a pressure sensor 68 that is mounted to the distal end portion of a branched-off tube 66 that is branched-off from the common tube 48 connected to the airbag 30A.

Figure 7B:
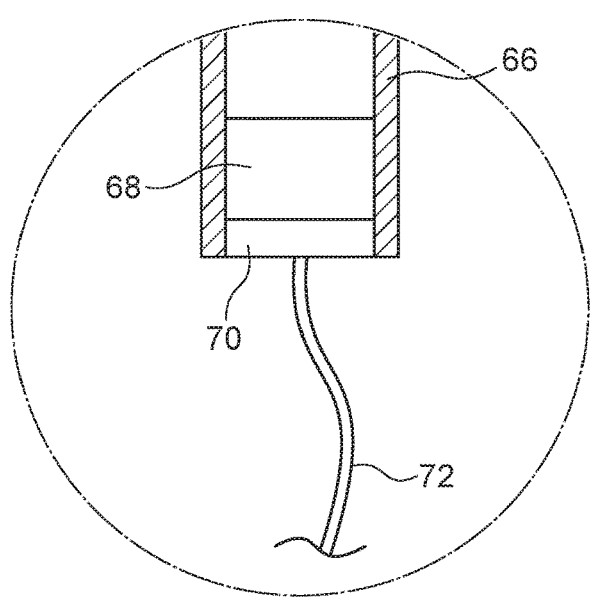
FIG. 7B is a cross-sectional view showing a pressure sensor that is provided at the biometric signal detecting section shown in FIG. 7A.

As shown in FIG. 7A and FIG. 7B, the pressure sensor 68 is fixed to the inner wall of the distal end portion of the branched-off tube 66. The pressure sensor 68 detects changes in the pressure that is applied to the airbag 30A, i.e., changes in the internal pressure (air pressure) of the airbag 30A at the time when pressure is applied from the exterior. A control section 70, which converts the results of detection of the pressure sensor 68 into electric signals and measures the change in pressure, is provided at the pressure sensor 68. The pressure sensor 68 and the control section 70 are fixed to the inner wall of the branched-off tube 66 by, for example, adhesion or the like. The control section 70 is connected to the control device 58 via a lead wire 72 (see FIG. 6).

Note that, in a structure in which the plural (e.g., two) airbags 30A are disposed in the transverse direction of the seat cushion 12 interior, although not illustrated, the pressure sensor 68 and the control section 70 are disposed so as to extend over the plural (e.g., two) branched-off tubes 66 that are branched-off from the common tubes 48 for the respective airbags 30A. Due thereto, the pressure sensor 68 detects changes in the pressures that are respectively applied to the plural (e.g., two) airbags 30A.

The biometric signal detecting section 60 is disposed within the seat cushion 12. At the biometric signal detecting section 60, biometric signals that have been converted into electric signals are detected due to, for example, changes in the pressure that is applied to the airbag 30A being detected by the respiration or the heartbeat or the pulse or the like of the vehicle occupant P. Further, due to changes in pressure being measured from the biometric signals at the control section 70, biometric information such as the respiratory rate or the heart rate or the pulse rate or the like of the vehicle occupant P are acquired. Moreover, the biometric information is inputted from the control section 70 to the control device 58, and, on the basis of the biometric information, the control device 58 operates the air supplying/discharging device 50. For example, when it is detected, on the basis of the biometric information, that the vehicle occupant P who is seated in the vehicle seat 10 is in a tense state, massaging operation of the airbags 30 is started by operating the air supplying/discharging device 50.

Operation and effects of the vehicle seat 10 of the first embodiment are described next.

As shown in FIG. 2 and the like, the concave portion 62, which is formed in a recessed shape so as to move away from the seated vehicle occupant P, is provided in the seat cushion 12 of the vehicle seat 10. The airbag 30A that can be inflated and expanded is mounted so as to extend over the concave portion 62. More concretely, the mounting pieces 64 extend-out from the transverse direction both sides of the airbag 30A toward the outer sides, and the mounting pieces 64 are mounted to peripheral edges of the concave portion 62 at the obverse 22A of the seat cushion pad 22. The biometric signal detecting section 60 has the airbag 30A and the pressure sensor 68. Biometric signals are detected due to the pressure that is applied to the airbag 30A being detected by the pressure sensor 68 in the state in which the airbag 30A is inflated.

In the above-described vehicle seat 10, the airbag 30A is mounted to as to extend over the concave portion 62. The airbag 30A is structured so as to, in the state in which the airbag 30A is inflated at the time of detecting biometric signals, not contact the side walls 62A and the bottom surface 62B of the concave portion 62. Due thereto, when the vehicle occupant P is seated, the inflated airbag 30A being pushed-against the side walls 62A and the bottom surface 62B of the concave portion 62 of the seat cushion 12 is suppressed. Therefore, during traveling or during idling of the vehicle, vibrations from the vehicle body being inputted to the airbag 30A via the seat cushion 12 is suppressed. Accordingly, the accuracy of detecting biometric information by the biometric information detecting section 60 can be improved.

Further, at the vehicle seat 10, the mounting pieces 64 extend-out from the transverse direction both sides of the airbag 30A toward the outer sides. The mounting pieces 64 are mounted to peripheral edges of the concave portion 62 at the obverse 22A of the seat cushion pad 22. Due thereto, the entire airbag 30A can be disposed at a position of not contacting the seat cushion 12, and, when the vehicle occupant P is seated, vibrations from the vehicle body being inputted to the airbag 30A via the seat cushion 12 is suppressed more reliably.

Further, at the vehicle seat 10, the airbag 30A of the biometric signal detecting section 60 is disposed beneath the buttocks of the seated vehicle occupant P (see FIG. 1). When the vehicle occupant P is seated, pressure is stably applied to the airbag 30A. Therefore, biometric signals of the vehicle occupant P can be detected stably by the biometric signal detecting section 60.

Moreover, the vehicle seat 10 has the plural airbags 30 for massaging at the seat cushion 12 and the seatback 14. The airbag 30A, which is among the plural airbags 30, is made to be the airbag 30A of the biometric signal detecting section 60. Therefore, biometric signals of the vehicle occupant P can be detected by utilizing the airbags 30 for massaging.

Accordingly, there is no need to provide an airbag that is used exclusively for detecting biometric signals, and the structure can be simplified.

A vehicle seat of a comparative example is described here. Although not illustrated, in the vehicle seat of the comparative example, the biometric signal detecting section has airbags for massaging, which are fixed to the obverse of the seat pad at the seat cushion, and a pressure sensor, which is mounted via branched-off tubes and common tubes that are connected to the airbags. The airbags are disposed between the seat pad and the slab so as to contact the both (refer to a structure that is similar to that of the airbag 30B shown in FIG. 4).

In the above-described vehicle seat of the comparative example, when the vehicle occupant is seated, the airbag is crushed by the vehicle occupant and the seat pad, and therefore, at the time of traveling or idling of the vehicle, the airbag is compressed due to relative movement between the seat pad and the vehicle occupant. Due thereto, there is the possibility that vibrations such as road noise and the like will be inputted to the airbags, and that the accuracy of detecting biometric information will deteriorate.

In contrast, in the vehicle seat 10 of the first embodiment, the airbag 30A is mounted so as to extend over the concave portion 62 of the seat cushion pad 22, and the airbag 30A is a structure that does not contact the side walls 62A and the bottom surface 62B of the concave portion 62 in the state in which the airbag 30A is inflated at the time of biometric signal detection. Due thereto, when the vehicle occupant P is seated, the airbag 30A being pushed-against the side walls 62A and the bottom surface 62B of the concave portion 62 is suppressed. Therefore, during traveling or during idling of the vehicle, vibrations from the vehicle body being inputted to the airbag 30A via the seat cushion 12 is suppressed. Accordingly, the accuracy of detecting biometric information of the vehicle occupant P can be improved by the biometric signal detecting section 60.

Second Embodiment

Figure 8:
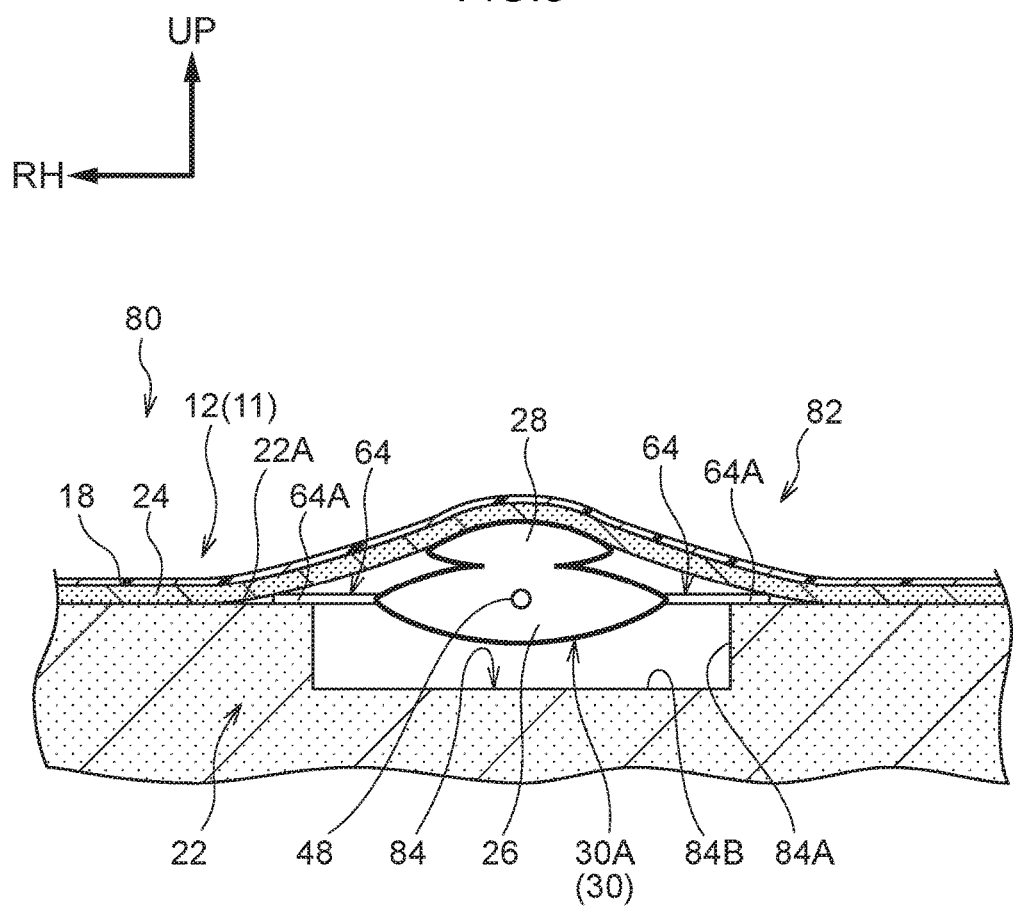
FIG. 8 is a cross-sectional view showing an airbag of a biometric signal detecting section that is provided at a vehicle seat relating to a second embodiment, in a first inflated state at a time of biometric signal detection.
Figure 9:
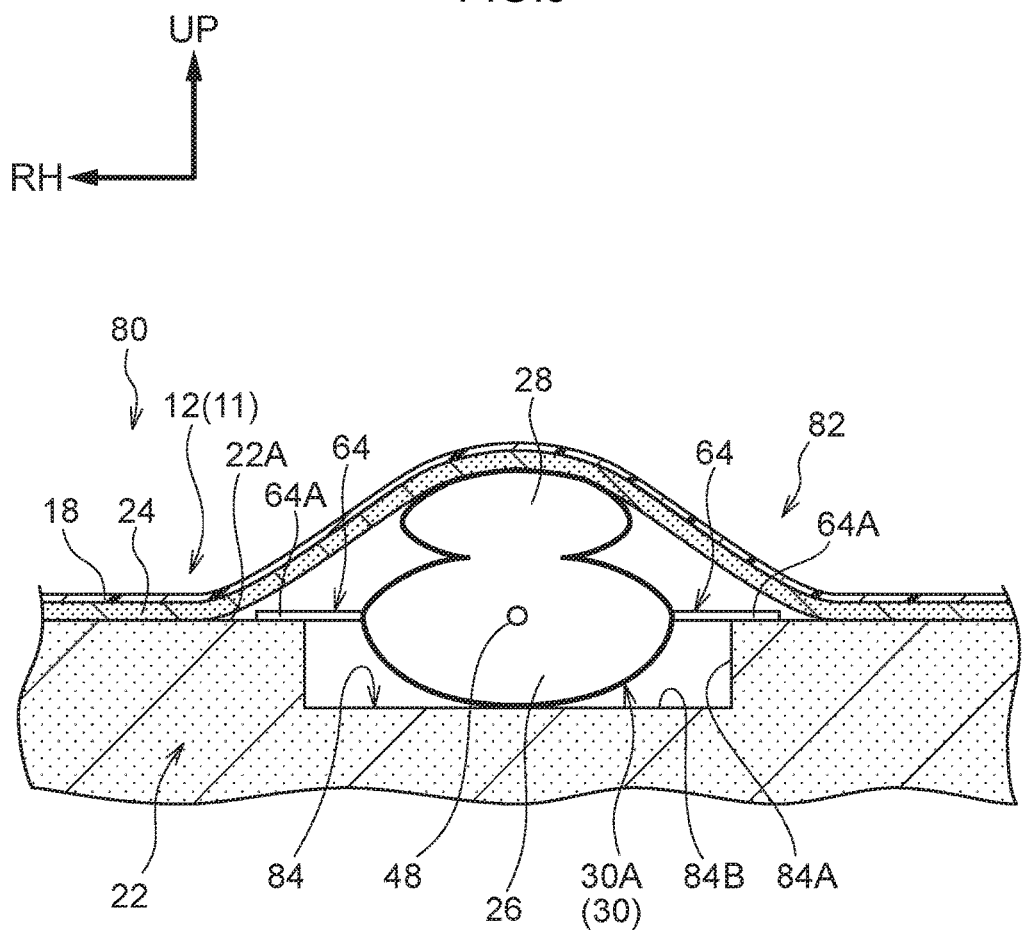
FIG. 9 is a cross-sectional view showing the airbag of the biometric signal detecting section that is provided at the vehicle seat relating to the second embodiment, in a second inflated state at a time of massaging.

A vehicle seat 80 relating to a second embodiment is described by using FIG. 8 and FIG. 9. Note that, in the second embodiment, structural elements, members and the like that are the same as those of the first embodiment are denoted by the same reference numerals, and detailed description thereof is omitted.

As shown in FIG. 8, in the vehicle seat 80 relating to the second embodiment, a concave portion 84, which is formed in a recessed shape so as to move away from the seated vehicle occupant P (see FIG. 1), is provided in the obverse 22A of the seat cushion pad 22 at the seat cushion 12. The concave portion 84 is formed by cutting the obverse 22A of the seat cushion pad 22 out in a concave shape. The concave portion 84 has four side walls 84A, which are substantially rectangular and are disposed substantially along the vertical direction, and a bottom surface 84B that is disposed substantially in the longitudinal direction and substantially in the transverse direction from the end portions at the vertical direction lower sides of the side walls 84A.

The vertical direction length of the side walls 84A at the concave portion 84 is shorter than the vertical direction length of the side walls 62A (see FIG. 2) of the concave portion 62 of the first embodiment. In other words, the depth of the bottom surface 84B of the concave portion 84 is shallower than the depth of the bottom surface 62B (see FIG. 2) of the concave portion 62 of the first embodiment.

A biometric signal detecting section 82 has the airbag 30A. The airbag 30A has the pair of mounting pieces 64. The outer side end portions 64A of the pair of mounting pieces 64 are fixed to peripheral edges of the concave portion 84 at the obverse 22A of the seat cushion pad 22. In the state in which the airbag 30A is disposed at the substantially central portion of the concave portion 84 interior, gaps are formed between the large diameter portion 26 and the side walls 84A of the concave portion 84. Although not illustrated, the biometric signal detecting section 82 has the pressure sensor 68 (see FIG. 7A) that is mounted via a branched-off tube that is branched-off from the common tube 48 of the airbag 30A.

The airbag 30A is structured such that the inflated state thereof differs between the time of biometric signal detection and the time of massaging (refer to FIG. 8 and FIG. 9). As shown in FIG. 8, at the time of biometric signal detection, the airbag 30A is in a first inflated state in which the airbag 30A does not contact the bottom surface 84B of the concave portion 84. Namely, at the time of biometric signal detection, the large diameter portion 26 of the airbag 30A does not contact the bottom surface 84B of the concave portion 84. Further, the airbag 30A is structured so as to not contact the side walls 84A and the bottom surface 84B of the concave portion 84 at the time of biometric signal detection in the state in which the vehicle occupant P (not shown) is seated in the vehicle seat 80.

Further, the airbag 30A is structured so as to inflate and contract at the time of massaging. As shown in FIG. 9, at the time of massaging, the airbag 30A is in a second inflated state in which the airbag 30A is inflated more than the first inflated state shown in FIG. 8 and the airbag 30A contacts the bottom surface 84B of the concave portion 84. Namely, the large diameter portion 26 of the airbag 30A contacts the bottom surface 84B. At the vehicle seat 80, the amount of air that is supplied to the airbag 30A is controlled, by the airbag driving device 40 (see FIG. 6), to be greater at the time of massaging than at the time of biometric signal detection. Due thereto, the inflated amount of the airbag 30A in the second inflated state at the time of massaging is controlled to be greater than the inflated amount of the airbag 30A in the first inflated state at the time of biometric signal detection.

In the vehicle seat 80 that is described above, as shown in FIG. 8, at the time of biometric signal detection, the airbag 30A is in the first inflated state in which the airbag 30A does not contact the bottom surface 84B of the concave portion 84. Therefore, in the state in which the vehicle occupant P is seated, the airbag 30A being pushed-against the side walls 84A and the bottom surface 84B of the concave portion 84 at the time of biometric signal detection is suppressed. Therefore, during traveling or during idling of the vehicle, vibrations from the vehicle body being inputted to the airbag 30A via the seat cushion 12 is suppressed, and the accuracy of detecting biometric information of the vehicle occupant P by the biometric information detecting section 82 can be improved.

Further, as shown in FIG. 9, at the time of massaging, the airbag 30A is in the second inflated state in which the airbag 30A is inflated more than in the first inflated state shown in FIG. 8 and the airbag 30A contacts the bottom surface 84B of the concave portion 84. In the second inflated state, the force by which the airbag 30A pushes the vehicle occupant P becomes large due to the reaction force from the bottom surface 84B that is contacted by the large diameter portion 26 of the airbag 30A. Therefore, at the vehicle seat 80, the massaging effect by the airbag 30A can be improved.

Note that, in the first embodiment and the second embodiment, the airbag 30A of the biometric signal detecting section is disposed beneath the buttocks of the vehicle occupant P who is seated in the vehicle seat, but the present invention is not limited to this structure. For example, an airbag that is disposed other than beneath the buttocks of the vehicle occupant P at the seat cushion 12 may be used as the biometric signal detecting section.

Further, in the first embodiment and the second embodiment, the airbag 30A, among the airbags 30 for massaging that are provided at the seat cushion 12, is made to be the airbag 30A of the biometric signal detecting section. However, the present invention is not limited to this structure. For example, there may be a structure in which an airbag, among the airbags 30 for massaging that are provided at the seatback 14, is made to be the airbag of the biometric signal detecting section. For example, by making the airbag, which is disposed near to the heart of the vehicle occupant, be the airbag of the biometric detecting section, biometric information such as the respiratory rate or the heart rate or the like of the vehicle occupant can be acquired more accurately. Further, there may be a structure in which airbags, among the plural airbags 30 at both the seat cushion 12 and the seatback 14, are made to be airbags for the biometric signal detecting section, i.e., a structure in which airbags for the biometric signal detecting section are provided at both the seat cushion 12 and the seatback 14.

Further, in the first embodiment and the second embodiment, there is a structure in which the pair of mounting pieces 64, which extend-out toward the outer sides from the airbag 30A, are mounted to peripheral edges of the concave portion at the seat cushion pad. However, the present invention is not limited to this structure. For example, there may be a structure in which one or two or more mounting pieces, which extend-out toward the outer sides from the airbag 30A, are mounted to peripheral edges of a concave portion at the seat main body.

Further, in the first and second embodiments, the airbag 30A is mounted so as to extend over the concave portion that is formed by cutting-out the obverse of the seat cushion pad 22, but the present invention is not limited to this structure. For example, there may be a structure in which a concave portion, at which the vicinity of a corner portion of the obverse of the seat cushion pad is sunken-in in a concave shape, or a concave portion, at which, in a case in which the seat cushion pad is structured by plural pads, a vicinity of a juncture between pads is sunken-in in a concave shape (i.e., a concave portion that is not formed by cutting-out), is utilized, and the airbag 30A is mounted so as to extend over this concave portion.

Moreover, in the first and second embodiments, the airbag 30 that has a two-step structure having the large diameter portion 26 and the small diameter portion 28 is provided, but the present invention is not limited to this structure, and the shape of the airbag 30 may be a different shape.

Moreover, in the first embodiment, the airbag 30A, among the airbags 30 for massaging, is made to be the airbag 30A of the biometric signal detecting section, but the present invention is not limited to this structure. For example, there may be a structure in which an airbag, which is not used for massaging and is dedicated for use for biometric signal detection and is provided at at least one of the seat cushion 12 and the seatback 14, is made to be the airbag of the biometric signal detecting section.

Note that the present invention has been described in detail by using specific embodiments, but the present invention is not limited to these embodiments, and it will be clear to those who are skilled in the art that various other embodiments are possible within the scope of the present invention.

What is claimed is:

1. A vehicle seat comprising:
a seat main body that has a seat cushion and a seatback;
a concave portion that is provided in at least one of the seat cushion and the seatback, and that is provided at a region supporting a seated vehicle occupant, and that is formed in a shape that is recessed in a direction of moving away from the seated vehicle occupant; and
a biometric signal detecting section having an airbag, which is mounted so as to extend over the concave portion and is capable of inflating and contracting, and a pressure sensor, which detects pressure applied to the airbag in a state in which the airbag is inflated, wherein the airbag is structured so as to maintain a clearance with respect to a bottom wall of the concave portion in a state in which the airbag is inflated at a time of biometric signal detection.

2. The vehicle seat of claim 1, wherein
a mounting piece extends-out toward an outer side from the airbag, and
the mounting piece is mounted to a peripheral edge of the concave portion.

3. The vehicle seat of claim 1, wherein the airbag is disposed beneath buttocks of the seated vehicle occupant.

4. The vehicle seat of claim 1, comprising
a plurality of massaging airbags at at least one of the seat cushion and the seatback,
wherein at least one massaging airbag, among the plurality of massaging airbags, is made to be the airbag of the biometric signal detecting section.

5. The vehicle seat of claim 4, wherein the massaging airbag that is provided at the biometric signal detecting section is, at a time of biometric signal detection, set in a first inflated state in which the airbag does not contact a bottom surface of the concave portion, and, at a time of massaging, the airbag inflates and contracts and, when inflated, is set in a second inflated state in which the airbag inflates more than in the first inflated state and contacts the bottom surface of the concave portion.

6. The vehicle seat of claim 1, wherein
the airbag has a large diameter portion, which is formed in a substantially rectangular shape as seen in an elevation viewed from above and whose outer diameter is large, and a small diameter portion, which communicates with the large diameter portion and is substantially rectangular and whose outer diameter is smaller than that of the large diameter portion, and
the small diameter portion is disposed at an upper side of the large diameter portion in a vertical direction.

7. The vehicle seat of claim 6, wherein mounting pieces, which are plate-shaped bodies that extend-out from the large diameter portion toward transverse direction outer sides, are provided at transverse direction both sides of the large diameter portion, and one of the mounting pieces is fixed to the large diameter portion, and another of the mounting pieces is mounted to a peripheral edge of the concave portion.

8. A vehicle seat comprising:
a seat main body that has a seat cushion and a seatback;
a concave portion that is provided in at least one of the seat cushion and the seatback, and that is provided at a region supporting a seated vehicle occupant, and that is formed in a shape that is recessed in a direction of moving away from the seated vehicle occupant;
a biometric signal detecting section having an airbag, which is mounted so as to extend over the concave portion and is capable of inflating and contracting, and a pressure sensor, which detects pressure applied to the airbag in a state in which the airbag is inflated,
a plurality of massaging airbags at at least one of the seat cushion and the seatback,
wherein:
at least one massaging airbag, among the plurality of massaging airbags, is made to be the airbag of the biometric signal detecting section, and
the massaging airbag that is provided at the biometric signal detecting section is, at a time of biometric signal detection, set in a first inflated state in which the airbag does not contact a bottom surface of the concave portion, and, at a time of massaging, the airbag inflates and contracts and, when inflated, is set in a second inflated state in which the airbag inflates more than in the first inflated state and contacts the bottom surface of the concave portion.

9. A vehicle seat comprising:
a seat main body that has a seat cushion and a seatback;
a concave portion that is provided in at least one of the seat cushion and the seatback, and that is provided at a region supporting a seated vehicle occupant, and that is formed in a shape that is recessed in a direction of moving away from the seated vehicle occupant; and
a biometric signal detecting section having an airbag, which is mounted so as to extend over the concave portion and is capable of inflating and contracting, and a pressure sensor, which detects pressure applied to the airbag in a state in which the airbag is inflated, wherein:
the airbag has a large diameter portion, which is formed in a substantially rectangular shape as seen in an elevation viewed from above and whose outer diameter is large, and a small diameter portion, which communicates with the large diameter portion and is substantially rectangular and whose outer diameter is smaller than that of the large diameter portion,
the small diameter portion is disposed at an upper side of the large diameter portion in a vertical direction, and
mounting pieces, which are plate-shaped bodies that extend-out from the large diameter portion toward transverse direction outer sides, are provided at transverse direction both sides of the large diameter portion, and one of the mounting pieces is fixed to the large diameter portion, and another of the mounting pieces is mounted to a peripheral edge of the concave portion.

* * * * *